United States Patent [19]
Baker et al.

[11] Patent Number: 5,849,353
[45] Date of Patent: Dec. 15, 1998

[54] PROCESS TO PREVENT BLOOM IN CHOCOLATE PRODUCTS THAT CONTAIN FAT SUBSTITUTES

[75] Inventors: Brian S. Baker, Millersburg; Jeffrey B. Fine; Lori A. Hornung, both of Harrisburg, all of Pa.

[73] Assignee: Hershey Foods Corporation, Hershey, Pa.

[21] Appl. No.: 705,604

[22] Filed: Aug. 30, 1996

Related U.S. Application Data

[60] Provisional application No. 60/003,107 Sep. 1, 1995.
[51] Int. Cl.$^6$ ........................................ A23G 1/00
[52] U.S. Cl. .......................... 426/660; 426/610; 426/607
[58] Field of Search ................................. 426/607, 610, 426/660

[56] References Cited

U.S. PATENT DOCUMENTS

| | | | |
|---|---|---|---|
| 5,258,197 | 11/1993 | Wheeler | 426/607 |
| 5,324,533 | 6/1994 | Cain | 426/607 |
| 5,411,756 | 5/1995 | Wheeler | 426/601 |
| 5,464,649 | 11/1995 | St. John | 426/660 |
| 5,599,574 | 2/1997 | Guskey | 426/607 |
| 5,609,906 | 3/1997 | Hokuyo | 426/607 |
| 5,753,296 | 5/1998 | Girsh | 426/593 |

FOREIGN PATENT DOCUMENTS

| | | | |
|---|---|---|---|
| 0354025 | 2/1990 | European Pat. Off. | 426/607 |
| WO 91/03944 | 4/1991 | WIPO | 426/607 |
| WO 94/12045 | 6/1994 | WIPO | 426/607 |

OTHER PUBLICATIONS

Minifre 1980 Chocolate, Cocoa and Confectionery AVI Publishing Co Inc. Westprot Ct pp. 80–87, 145–150, 494–507.

Softly 1994 Composition of Representative Salatrim fat preparations J Agric Food Chem 42:461–467.

Leissner, et al. Vegetable Fat in Chocolate, Compound & Coating Production:, Karlshamns Oils & Fats Academy, 1991, pp. 34–40.

*Primary Examiner*—Carolyn Paden
*Attorney, Agent, or Firm*—Scully, Scott, Murphy & Presser

[57] ABSTRACT

The present invention is directed to a process for preparing a chocolate-like product containing non-tempering cocoa butter substitute and to the product prepared therefrom.

31 Claims, No Drawings

5,849,353

PROCESS TO PREVENT BLOOM IN CHOCOLATE PRODUCTS THAT CONTAIN FAT SUBSTITUTES

This application claims the benefit of U.S. Provisional Application No. 60/003,107, filed Sep. 1, 1995.

FIELD OF THE INVENTION

The present invention relates to a process for prolonging the shelf life and for retarding fat bloom in chocolate-like products containing non-tempering cocoa butter substitutes, and to the product prepared by said process.

BACKGROUND OF THE INVENTION

In today's health conscious society, there is an evergrowing demand for low calorie and low fat foods. This consumer awareness of the caloric and fat content of food has created a need in the food industry to replace at least a portion of the fat in these prepared foodstuffs with a component that would not only lead to reduced calorie content but also maintains the taste, appearance, smell and mouth feel of the foodstuff. Foodstuffs, especially those high in caloric content and fat, such as confectionery products, are therefore prime targets for such an undertaking. Thus, the consumer has demanded that even chocolate products be prepared from these reduced calorie fats.

An example of a reduced calorie fat is disclosed in U.S. Pat. No. 5,258,197 to Wheeler et al., an article by Robert E. Smith, et al., in *J. Agric. Food Chem.* 1994, 42,432–434 and Softly, et al. in *J. Agric. Food Chem.* 1994, 42, 461–467, the contents of all of which are also incorporated by reference. They disclose a fat substitute called SALATRIM which is an acronym for short and long acyl triglyceride molecule. SALATRIM is a family of structured triacylglycerols (also known as designer fats) which is composed of a mixture of long chain saturated fatty acids (such as stearic acid) and short chain fatty acids (such as acetic, propionic and/or butyric) esterified to a glycerol backbone. SALATRIM has approximately half of the calories of a normal edible oil. More specifically, it has a caloric availability of five kilocalories per gram, instead of the normal nine kilocalories per gram in natural fats.

SALATRIM can be designed to be similar to cocoa butter in conventional chocolate. Therefore, when cocoa butter is replaced with such a SALATRIM, a significant reduction in calorie and calculated fat can be realized. However, SALATRIM displays incompatibility with other natural fats common in chocolate, such as cocoa butter and milkfat. The mixture of SALATRIM, cocoa butter and milkfat solidifies at temperatures well above the proper tempering temperatures of cocoa butter. The result of this is that the cocoa butter forms unstable crystals as the mass continues to cool. Bloom develops as a result of the cocoa butter converting to its most stable form over a period of time.

Fat bloom in chocolate products is a major problem in the chocolate industry. As is familiar to the skilled artisan, bloom is a separation of fat crystals from the matrix of the chocolate, generally caused by separation of cocoa butter from the matrix and extrusion or recrystallization of fat to or on the surface with the result being white layering or splotches on the surface of the chocolate. Bloom is usually ascribed to partial liquification (due, for instance, to temperature fluctuations) and then recrystallization of the fat which sometimes migrates to the surface. The bloom appears as a white, waxy substance on the surface of the chocolate and is objectionable to consumers.

The present inventors found that when they prepared SALATRIM containing chocolate like products, and stored the products immediately after their production at room temperature e.g., at 70° F., the chocolate-like products bloomed very rapidly, i.e., within a few days or weeks. Thus, it was determined that SALATRIM containing chocolate-like products not only have a very short shelf life, but also lose their organoleptic chocolate properties very rapidly and therefore would be rejected by consumers for lack of desirable aesthetic quality.

Various approaches were suggested to overcome this problem. For example, bloom inhibitors, such as PRESTINE®, were used in an attempt to prevent and/or retard the bloom in SALATRIM chocolate containing products. However, this alone did not prove successful.

Other methods were suggested, such as modification of the process for making the chocolate-like products, but to date, no one has heretofore found a methodology for prolonging the shelf life of these SALATRIM containing chocolate-like products or retarding chocolate bloom therein. However, the present inventors found a methodology to overcome this problem. The present invention is directed to a methodology which not only retards fat bloom but also prolongs the shelf life and appearance of the SALATRIM containing chocolate-like products as well as other chocolate-like products containing non-tempering fats.

SUMMARY OF THE INVENTION

The present invention is directed to a process for making a chocolate-like product containing a non-tempering cocoa butter substitute, such as a SALATRIM containing chocolate-like product, which comprises heating a chocolate paste comprising said cocoa butter substitute, cocoa powder, a nutritive carbohydrate sweetener, an emulsifier, and optionally milkfat and/or an anti-blooming agent at sufficient temperatures to produce a chocolate of desired consistency, cooling the mass under conditions sufficient to crystallize the chocolate, and storing the cooled product at a temperature ranging from about 40° F. to about 65° F. for at least about 12 hours. The present invention is also directed to the product produced by said process.

DETAILED DESCRIPTION OF THE INVENTION

The process of the present invention retards fat bloom in non-tempering cocoa butter substitute based chocolate-like products. When the chocolate-like products are prepared by the present process, the shelf life of the product is at least 3 months, and preferably 12 to 18 months. The product also has the organoleptic and rheological properties, including the chocolate flavored taste, mouth feel, and consistency, associated with regular chocolate products having the normal fat content. In addition, it has a pleasing appearance. However, if the present process is not followed, the chocolate-like product will bloom within a few weeks, and typically within a few days.

As indicated hereinabove, the chocolate-like product produced by the present process has the rheological flow properties and the organoleptic properties associated with chocolate having the normal fat content. More specifically, the fat content of the product produced by the present invention is as low as 20% (w/w). More preferably, it is in the range of about 20 to about 33% (w/w). More specifically, the chocolate-like product produced by the present process contains about 5% to about 25% (w/w) cocoa powder, about 40% to about 60% (w/w) sweetener, about 12% to about 25% (w/w) reduced calorie fat and up to about 7% (w/w) milkfat. It also contains an emulsifying effective amount of an emulsifier. Preferably it contains less than about 1.5% (w/w) emulsifier, and more preferably ≦ about 1% (w/w). It also may contain water and other additional ingredients indicated hereinbelow.

Cocoa powder is the food prepared by pulverizing and pressing the cocoa liquor or nib to remove part of the fat (cocoa butter). The cocoa powder utilized in the present process either is commercially made or is prepared from chocolate liquor prepared by techniques known to the skilled artisan. For example, its preparation is described in the Encyclopedia of Food Science and Technology, edited by Y. H. Hui, John Wiley and Sons, Inc., New York, N.Y., Vol 1, pp 396–398, 1992, the contents of which are incorporated by reference. Typically, the cocoa powder that is utilized is the medium fat cocoa powder, commonly referred to as cocoa, which contains between about 10% and about 22% fat, or the low fat cocoa, containing less than 10% fat. It is preferred that the cocoa powder contains about 10 to about 12% fat.

An essential ingredient of the chocolate-like products produced by the present invention is the non-tempering cocoa butter substitute. For the purpose of this invention, the term "cocoa butter substitute" is to be interpreted to mean non-tempering fat. The cocoa butter substitute is preferably present in at least 60% (w/w) and up to but excluding 100% of the total fat in the final product, e.g., chocolate-like product, produced by the present process.

The cocoa butter substitutes that are used in the present invention have melting characteristics similar to cocoa butter. Examples of cocoa butter substitutes useful in the present invention include SALATRIM, fractionated palm kernel oil, and the like. As indicated hereinabove, SALATRIM is a family of edible oils which has a long-chain fatty acid and two short-chain saturated fatty acids esterified to the glycerol backbone. The long chain source is a hydrogenated vegetable oil, such as canola oil, cottonseed oil, soybean oil and the like. The short chain fatty acid is an acetic acid, propionic acid or butyric acid, and the short chain source includes triacetin, tripropionin, tributyrin, and the like. SALATRIM is prepared by the interesterification of these highly hydrogenated vegetable oils with triacylglycerols of acetic and/or propionic acid and/or butyric acids, as described in Softly et al. in *J. Agric. Food Chem.,* 1994, 461–467, and U.S. Pat. No. 5,258,197 to Wheeler, et al., the contents of which are all incorporated by reference. Alternatively, SALATRIM can be prepared by chemical synthesis, as described in U.S. Pat. No. 5,258,197, the contents at which are incorporated by reference.

SALATRIM is available in many forms, such as SALATRIM 23 CA, SALATRIM 23 SO, SALATRIM 23 SO HM (high melt). The "2" and "3" refers to the number of carbon atoms in the fatty acid esterified to the glycerol backbone, and the "SO" and "CA" refers to the long-chain source, i.e., "SO" refers to the source as soybean oil, while the "CA" refers to the source as canola oil. Thus, for example, SALATRIM 23 CA has a short-chain source triacetin and tripropionin and a long chain source of hydrogenated canola oil in a mole ratio of 11:1:1, respectively, while SALATRIM 23 SO has a short chain source of triacetin and tripropionin and a long chain source of hydrogenated soybean oil in a mole ratio of 11:1:1 respectively.

It is preferred that the SALATRIM which is utilized in the present invention is a triacylglycerol containing at least one fatty acid having a carbon length greater than or equal to 16 carbon atoms, such as stearic acid. More specifically, the long chain fatty acid residue has 16–40 carbon atoms and more preferably 16–24 carbon atoms and most preferably 18 to 22 carbon atoms. It is preferred that the carbon length of the other fatty acids present in the triglyceride backbone of SALATRIM contains from 2 to 4 carbon atoms. These triglycerides have a melting point ranging about 20° C. to about 60° C., preferably between about 30° C. and about 50° C., and preferably between about 30° C. and about 40° C. The preferred cocoa butter substitute is SALATRIM, including SALATRIM 23 SO, SALATRIM 23 SO HM (high melt) (wherein the molar ratio of short chain fatty acids to long chain fatty acids is lower than in SALATRIM 23 SO), SALATRIM 23 CA and the like.

Another ingredient present in the chocolate-like product of the present invention is the nutritive carbohydrate sweetener. Nutritive carbohydrate sweeteners with varied degrees of sweetness intensity useful in the present invention are those typically used in the art and include, but are not limited to, sucrose, dextrose, fructose, lactose, maltose, glucose, glucose syrup solids, corn syrup solids, invert sugar, hydrolyzed lactose, honey, maple sugar, brown sugar, molasses and the like.

In an alternative embodiment of the present invention, a sugar substitute may partially replace the nutritive carbohydrate sweetener. As used herein, the term "sugar substitute" refers to any non-sugar sweetener that is typically used in the art instead of sugar. Examples include bulking agents, sugar alcohols (polyols), or high potency sweeteners or combination thereof.

The high potency sweeteners include aspartame, cyclamates, saccharin, acesulfame-K, neohesperidin dihydrochalcone, sucralose, alitame, stevia sweeteners, glycyrrhizin, thaumatin and the like and mixtures thereof.

Examples of sugar alcohols may be any of those typically used in the art and include sorbitol, mannitol, xylitol, maltitol, isomalt, lactitol, and the like.

Bulking agents as defined herein may be any of those typically used in the art and include polydextrose, cellulose, and its derivatives, maltodextrin, gum arabic and the like.

It is preferred that the sweetener is 100% nutritive carbohydrate sweetener. The preferred sweetener is sucrose.

Another ingredient present in the chocolate-like products of the present invention is the edible emulsifier.

Emulsifiers useful in the present invention may be any of those typically used in the art and include, but are not limited to, lecithin derived from vegetable sources, such as soybean, safflower, corn, etc; fractionated lecithins enriched in either phosphatidyl choline or phosphatidyl ethanolamine, or both; mono and diglycerides thereof; monosodium phosphate derivatives of mono and diglycerides of edible fats or oils; lactylated fatty acid esters of glycerol and propylene glycol; hydroxylated lecithins; polyglycerol esters of fatty acids; propylene glycol; mono and diester of fats and fatty acids; DATEM (diacetyl tartaric acid esters of mono and diglycerides); PGPR (polyglycerol polyricinoleate); YN® (ammonium salt of phosphatidic acid); polysorbate 60, 65 and 80; sorbitan monostearate; sorbitan tristearate, oat extract; and the like.

The chocolate-like products of the present invention may contain a trace of water. It is preferred that they contain less than about 2% moisture, and preferably less than about 0.75% water by weight.

Other optional ingredients normally found in chocolate-like products of the present invention may additionally be present. These optional ingredients include non-fat milk solids, non-fat cocoa solids, sugar substituents, natural and artificial flavors, such as vanillin, spices, coffee, ethyl vanillin, salt, brown nut-meats, natural vanilla and the like or combination thereof, antioxidants, (e.g. preservatives, such as TBHQ (t-butylhydroquinone), tocopherols, and the like), proteins, and the like.

In addition, as described hereinbelow, the chocolate-like products of the present invention optionally contain anti-blooming agents. "Anti-blooming agents" as used herein include the bloom inhibiting agents normally used in this art. In addition, various emulsifiers, such as those described hereinbelow, also have anti-blooming properties. Unless specified to the contrary herein, the term "anti-blooming agents" includes emulsifiers having anti-bloom properties as well as bloom inhibiting agents.

The procedure for preparing the chocolate-like product is described in U.S. Pat. No. 5,464,649 to St. John et al. the contents of which are incorporated by reference, except the tempering step is eliminated, and the present process has the additional storage step, as described hereinbelow.

A preferred procedure is as follows. This process is exemplary, utilizing SALATRIM as the non-tempering cocoa butter substitute. However, the procedure is just as applicable utilizing other non-tempering cocoa butter substitutes, and thus should not be considered as being limited to SALATRIM.

The non-tempering cocoa butter substitute, such as SALATRIM, and the sweetener, such as sugar, are mixed together at a weight ratio of about 1:2 to about 1:10, and more preferably about 1:3 to about 1:5 and most preferably at about 1:4 in a batch mixer. The resulting mixture forms a paste. Next, the mixture is refined in accordance with techniques used in the confection arts. The refining step is essentially a grinding operation, in which the paste from the mixer is passed between steel rollers and converted to a refined mass. Refining breaks up the particle sizes of the paste so that its particle sizes are significantly reduced. In a preferred embodiment, the mixture is refined by being passed through the nips of a plurality of roll refiners to produce a mixture containing SALATRIM and sugar, wherein the sugar particles are preferably smaller than about 60 microns and more preferably smaller than about 50 microns and most preferably smaller than or equal to about 40 microns. In an embodiment of the process which is not a necessary step, water and emulsifier are added to the refined SALATRIM mixture and then the mixture is subjected to a drying process, e.g., in a paddle dryer or conch, to obtain a paste material having less than about 2% moisture.

Apart from the preparation of the paste described hereinabove, the other chocolate making ingredients are mixed and added separately. Such additional ingredients include the cocoa powder which is present in amounts in the final product ranging from about 5% to about 25% by weight, and an edible emulsifier present in the final product in emulsifying effective amounts. Additionally, non-fat milk solids, additional low calorie fat, chocolate liquor, lactose, milkfat, whole milk powder, water or mixtures thereof may be added to the second mixture. These ingredients are mixed together and refined, as described hereinabove to produce a second mixture.

The SALATRIM paste is mixed with the second mixture while heating to give the final consistency to the chocolate. Typically, the mixtures are heated to temperatures above 90° F., usually 100° F. to about 150° F. If necessary, additional SALATRIM is added to the combined mass to bring the fat levels to the desired concentration.

Alternatively, the SALATRIM final product can be prepared by mixing the ingredients described hereinabove in one mixer, refining and then performing the heating step as described hereinabove.

Although an anti-blooming agent may be added at any step in the above process, it is preferred that if an bloom-inhibiting agent is utilized, it is added to the heated mixture. The anti-blooming agent is added in bloom inhibiting effective amounts. It is preferred that the amount added is at least about 0.1% (w/w). More specifically, it is more preferred that the anti-blooming agent be added in amounts ranging from about 0.1% to about 2% (w/w), and even more preferably from about 0.24% to about 0.71% (w/w).

The next step in the process is dependent upon the ultimate use of the product. This step includes the standard processes that are typically used in the confection arts, such as molding, depositing, extrusion, enrobing, panning, and the like, except the paste containing the non-tempering cocoa butter substitute is utilized in place of the normal chocolate. It is preferred, however, that the chocolate produced by the present invention is a non-molded product.

Nevertheless, whichever step is utilized, the hot paste is cooled. Usually, it is cooled in a cooling zone wherein the mass is cooled for sufficient time to crystallize the chocolate. Typically, the mass is carried to a cooling tunnel wherein the temperature ranges between about 40° F. to about 70° F. and usually is cooled for less than about 20 minutes.

As an embodiment of the present invention, the last step of the process is illustrated utilizing the technique of "depositing" to form a chocolate-like morsel or chip product. In this embodiment, the heated paste is transferred to a chocolate chip depositor which contains pistons and nozzles. The pistons force the paste through the nozzles, which give the chocolate chip its shape, and the chip is subsequently deposited onto a conveyor belt. The belt carries the mass to a cooling zone wherein the mass is cooled for sufficient time to crystallize the chocolate. Typically, the mass is carried to a cooling tunnel, wherein the temperature ranges between about 40° to about 70° F. Usually, the paste is cooled for less than about 20 minutes. It is preferred that even before the paste enters the cooling tunnel, it is cooled initially by air drying. After the mass is cooled, the chip is removed from the conveyor belt.

It has been found that the methodology to significantly retard bloom is an additional step after the product is produced. The inventors have found that the product must be stored at a critical temperature for sufficient time for bloom to be significantly retarded. More specifically, this additional step is to place the product produced, such as the chocolate chip product, into storage within a few hours of its preparation, e.g. about 1 to about 24 hours, wherein the product is in storage and maintained at a temperature effective and time sufficient to inhibit bloom in the chocolate products containing non-tempering cocoa butter substitute for at least three months. More specifically, it was found that the additional step was to maintain, within a few hours of its preparation (e.g., about 1 to about 24 hours), the chocolate product produced containing the cocoa butter substitute at a temperatures ranging between about 40° to about 65° F. and more preferably between about 55° F. and about 65° F. for at least about 12 hours, and more preferably for at least about one day. In an even more preferred embodiment, the product is stored at temperatures between about 40° F. and about 65° F. for about 1 to about 10 days and preferably 1–5 days;

however, the lower the temperature, generally the shorter amount of time required for storage at the above-temperature.

After the product is stored under the prescribed conditions, then the product can be subjected to higher temperatures below the melting point thereof, such as room temperature, with the result that the onset of bloom is significantly retarded.

However, if the product is initially stored at temperatures greater than about 65° F., such as at 70° F., during the critical time, then the product will bloom within a few weeks, and often within a few days. On the other hand, a slight cooling down of the storage temperature of the product to about 65° F. (including 65° F.) or less made a remarkable difference, since the chocolate-like products produced by the present invention surprisingly did not bloom, even after 3 months of storage. Thus, it has been found that if the product is initially stored under appropriate conditions for the appropriate amount of time, and then subjected to room temperatures subsequent thereto, the product did not bloom even after 5–6 months.

It is to be understood that at any given temperature, there may be slight fluctuations and variations in the temperature within a few degrees, for example, about 1° F. to about 3° F., for a very short period of time, e.g., for less than about 1 hour, so that the storage temperature may not constantly remain at one temperature. Thus, if the temperature is, for example 65° F., at any particular instant, the temperature may be, for example, 66° F. or 67° F. However, it is to be understood that the average temperature of the product over the period of storage is 65° F. Thus, these slight insignificant variations in temperature of a few degrees over a short period of time are also to be contemplated to be within the scope of the present invention as long the average temperature over the period of storage is within the prescribed limits.

Without wishing to be bound by an essentially hypothetical elucidation, and again using SALATRIM as the exemplification of the non-tempering cocoa butter substitute, it is believed that about 65° F. represents a temperature which allows SALATRIM to anneal. Sufficient time is required for the chocolate product to equilibrate with the storage temperature so that the product is maintained at that storage temperature and once it equilibrates with the storage temperature, to permit the crystallization of SALATRIM to be completed, i.e., to allow the SALATRIM to anneal and trap inside its matrix the unstable cocoa butter. In fact, below 65° F., the cocoa butter is a solid enabling the SALATRIM to more easily trap it inside. Once trapped inside, unless the chocolate-like product is melted, the cocoa butter remains inside. Thus, the product does not bloom after five days of storage at temperatures, for example, below 65° F. even when the temperature is subsequently raised to 70° F.

It is to be understood that in a large scale, especially when the chocolate product is packaged and the packages are stacked in the storage area next to one another and on top of one another, the packages in the interior of the storage area are insulated by the packages exterior to it; as a consequence thereof it requires longer time for those products in the interior to equilibrate with the ambient temperatures. Thus, to ensure that the temperature of the product placed in the storage area is maintained at the appropriate temperatures described hereinabove, the products produced by the present invention is placed into storage for a sufficient amount of time to achieve the desired objectives indicated hereinabove. The longer the time, the more likely the chocolate products will equilibrate with the storage temperature and be maintained at that temperature and the more likely that the annealing process will be completed. Thus, it has been found that at least about 12 hours is sufficient time for the product produced by the present invention to achieve and maintain the temperature necessary to permit the annealing process described hereinabove to take place.

On the other hand, if the chocolate products containing SALATRIM are stored at temperatures above about 65° F., such as 70° F., the SALATRIM is not annealed, and the cocoa butter is not entrapped within the SALATRIM matrix. Consequently, the cocoa butter is free to migrate to the surface and crystallizes thereon, resulting in a product that blooms.

It is also believed, without wishing to be bound, that anti-blooming agents, e.g., bloom inhibiting agents, such as AMF (anhydrous milk fat) and PRESTINE® (fat prepared from palm oil and palm kernel oil) and the like and emulsifiers such as sucrose fatty acid esters, sorbitan monostearate (e.g., SPAN 60®, DURTAN 60K® and the like), and other sorbitan fatty acid esters, e.g., sorbitan tristearate, polyoxyethylene sorbitan monostearates and the like, which also inhibit blooming, have an additive effect to the process described hereinabove. However, it is noted that these bloom inhibiting agents and emulsifiers were not effective when used alone to inhibit bloom in chocolate-like products, such as SALATRIM based chocolate without cold storage (e.g., storage temperatures of about 65° F. for at least about 12 hours). Without wishing to be bound, these bloom inhibiting agents and emulsifiers are believed to inhibit bloom by blocking the polymorphic transformation of Form V crystals to Form VI crystals, which is the most stable form of cocoa butter and is normally associated with bloom. However, they were ineffective in preventing or retarding bloom at temperatures of 70° F. or higher because the cocoa butter at these temperatures has Form III crystals, not Form V crystals.

Nevertheless, as the SALATRIM based chocolate ages, there is a tendency for the crystals of cocoa butter to form the more stable V and VI crystals. Therefore, over a period of time, the anti-blooming agent is believed to extend the shelf life against bloom when the cocoa butter contains Form V crystals.

This method to prevent blooming is quite simple, and simultaneously, economically efficient. Except for the ingredients normally present in a chocolate, and except for the addition of a non-tempering cocoa butter substitute, no additional ingredients are required. No catalyst is required. No non-glycerol based fat is required to be added. In addition, the normal processes used to make chocolate do not need to be modified, as described by the present invention. Yet, the product produced in accordance with the present invention maintains the rheological and organoleptic characteristics of chocolate made from normal fat.

Although no anti-blooming agent is required to be added, as described hereinabove, an embodiment of the present invention is the addition of the anti-blooming agent to the process described herein. It has been found that the onset of blooming is even more effectively retarded if an anti-blooming agent is additionally present. Thus, another embodiment of the present process is the addition of an anti-blooming agent in bloom inhibiting effective amounts to the product containing the non-tempering cocoa butter substitute, nutritive carbohydrate sweetener, cocoa powder, and emulsifier and optionally milkfat and other ingredients normally added to chocolate in accordance with the method described hereinabove, followed, shortly after preparation thereof, by the storage of the product at a temperature ranging from about 40° F. to about 65° F., and more preferably from about 55° F. to about 65° F. for at least about twelve hours, and more preferably for at least about 1 day.

This methodology for preventing or retarding fat bloom can be used in various non-tempered chocolate products such as milk chocolates, dark chocolate, skim milk chocolate, buttermilk chocolate, white chocolate, semisweet chocolate, sweet chocolate products and the like. The methodology for preventing or retarding fat blooming can also be used in other products, such as butterscotch chips, in the absence or presence of anti-blooming agents, for example, fractionated palm kernel oil.

Unless specified to the contrary, it is to be noted that all of the percentages are by weight.

The following examples are provided to further illustrate the present invention.

EXAMPLE 1

Approximately 1 part by weight to 4 parts by weight SALATRIM 23 SO to sugar were mixed for 30 minutes at 120° F. to form a paste having a fat content of 21% fat (w/w). The paste was refined to produce particles of approximately 40 microns. Less than 3% water and 1% emulsifier were mixed with the mass and then the resulting mixture was heated at 150° F. for 90 minutes. Cocoa powder containing 11% cocoa butter and additional SALATRIM 23 SO were added thereto so that the fat content is approximately 22%. The product was conched for 90 minutes at 150° F. The resulting heated product was standardized to 23% fat content by adding additional SALATRIM 23 SO. The resulting finished paste was then placed into 5 gallon buckets and stored overnight at 125° F. Next, the product was slightly cooled to 120° F., placed into a chip depositor wherein it was extruded into a chip and the product was deposited on a conveyor belt. The conveyor belt carried the product to a cooling tunnel set at a temperature of 40° F. where it was cooled for two minutes.

Samples were then placed in sealed plastic bags. The sealed plastic bags were placed into storage at 65° F. and 60° F. for time periods indicated below. After the storage period, the samples were then transferred to a final storage facility wherein the temperature was 70° F. and 75° F. The chocolate chips were monitored for six months storage.

In the table hereinbelow, the time indication, such as "three day, two weeks", etc. indicates that the chip was almost a completely white product within that specified period, indicative of unacceptable heavy bloom. Also, it was found that the difference between a final storage temperature of 70° F. or 75° F. was insignificant, and thus the table below represents only the final storage temperature of 70° F. The data is indicated in the table hereinbelow:

| Holding Temp. | Time of Hold | Bloom |
|---|---|---|
| 60 | 0 hr | 3 days |
| 60 | 4 hr | 3 weeks |
| 60 | 20 hr | 15 weeks |
| 60 | 28 hr | 17 weeks |
| 60 | 52 hr | 22 weeks |
| 60 | 5 days | 24 weeks |
| 65 | 0 hr | 3 days |
| 65 | 4 hr | 3 weeks |
| 65 | 20 hr | 13 weeks |
| 65 | 28 hr | 15 weeks |

-continued

| Holding Temp. | Time of Hold | Bloom |
|---|---|---|
| 65 | 52 hr | 18 weeks |
| 65 | 5 days | 21 weeks |

This table clearly shows that cool storage, even in the absence of anti-blooming agents, for sufficient time must be allowed for the product to cool and approach ambient holding temperature in accordance with the present invention so that a significant improvement in retarding the onset of bloom is achieved.

EXAMPLE 2

The procedure of Example 1 was repeated except an anti-blooming agent, such as PRESTINE® or an emulsifier, such as DURTAN 60K® was mixed with the finished SALATRIM paste in a 30 quart Hobart mixer. The chocolate chips were monitored for about 14 months. The results are shown hereinbelow.

| Treatment | Time of Hold | Bloom |
|---|---|---|
| 0.4% PRESTINE | 0 hr | 3 days |
| 0.4% PRESTINE | 24 hr | 7 months |
| 0.4% PRESTINE | 96 hr | 11 months |
| 0.24% DURTAN 60 | 0 hr | 3 days |
| 0.24% DURTAN 60 | 24 hr | 4 months |
| 0.24% DURTAN 60 | 96 hr | 11 months |
| 0.71% DURTAN 60 | 0 hr | 4 days |
| 0.71% DURTAN 60 | 24 hr | >14 months |
| 0.71% DURTAN 60 | 96 hr | >14 months |

This table clearly shows that anti-blooming agents, including emulsifiers having anti-blooming properties, can extend the shelf-life significantly. However, this table also shows that storing the chips under the prescribed conditions for sufficient time is extremely important to retard bloom. The data also demonstrate that addition of anti-blooming agents, without the step of simultaneous storage, results in a product which bloomed within a few days after its preparation.

It is to be noted from the results in Tables 1 and 2 that when the chocolate chips were stored under the prescribed conditions for the allotted time period, the chocolate chips did not bloom within 2.5 months, regardless of the presence or absence of an anti-blooming agent. On the other hand, if the anti-blooming agent is present, and the chocolate chips are stored outside of the prescribed temperature range, the chocolate chip generally bloomed. Therefore, these results clearly indicated that an anti-blooming agent is not necessary. Nevertheless, although not necessary, an anti-blooming agent may optionally be present in the paste and the combination of an anti-blooming agent and the storage step, in accordance with the present invention, retards even more effectively the onset of bloom.

EXAMPLE 3

The procedure of Example 1 was repeated except the temperature of the product was increased to room temperature after the cooling tunnel and before 60° F. cool storage. The samples in the following table were then put in 60° F. for 5 days and then a final storage of 70° F. The results are indicated hereinbelow:

| Time at Room Temperature | Bloom |
| --- | --- |
| 0 hr | 5.5 months |
| 1 hr | 5 months |
| 2 hr | 5 months |
| 4 hr | 4 months |
| 8 hr | 3 months |
| 24 hr | 2 weeks |
| 48 hr | 5 days |

This data clearly show that it is preferable that the product not be allowed to increase in temperature before cool storage.

The following example is directed to a milk-powder based chocolate product:

EXAMPLE 4

Approximately 1 part by weight to 4 parts by weight SALATRIM 23 SO to sugar were mixed for 30 minutes at 120° F. to form a paste having a fat content of 21% fat (w/w). The paste was refined to produce particles of approximately 40 microns. Less than 3% water and 1% emulsifier were mixed with the mass, and then the resulting mixture was heated at 150° F. for 90 minutes. Cocoa powder containing 11% cocoa butter, chocolate liquor containing 55% cocoa butter, non-fat milk solids, milk fat, and additional SALATRIM 23 SO were mixed for 30 minutes at 120° F. This mass was refined to approximately 40 microns and added to the paste. The resulting product was conched for 90 minutes at 150° F. and then standardized to 23% fat content by adding additional SALATRIM 23 SO. The product was treated similarly to Example 1. Resulting chips were sealed in plastic bags and stored at 60° F. The results are indicated hereinbelow:

| Time of 60° F. Hold | Final Storage Temperature | Bloom |
| --- | --- | --- |
| 0 hr | 70 | 1 week |
| 5 days | 70 | >7 months |
| 0 hr | 75 | 1 week |
| 5 days | 75 | >7 months |

The results clearly show that the prescribed storage conditions are also effective with a milk powder based chocolate.

COMPARATIVE EXAMPLE

The above procedure of Example 1 was repeated, except the conditions were as modified hereinbelow. The results are given in the following table.

| Test Comments | Post-Cooling Tunnel Treatment Temp/Time | Cool Storage Temp/Time | Final Storage | Bloom |
| --- | --- | --- | --- | --- |
| 1 Deposit 100° F./Cool 70° F. | — | — | 70 | Within one week |
| 2 Deposit 110° F./Cool 70° F. | — | — | 70 | Within one week |
| 3 Deposit 130° F./Cool 70° F. | — | — | 70 | Within one week |
| 4 Deposit 100° F./Cool 50° F. | — | — | 70 | Within one week |
| 5 Deposit 110° F./Cool 50° F. | — | — | 70 | Within one week |
| 6 Deposit 130° F./Cool 50° F. | — | — | 70 | Within one week |

The above-preferred embodiments and examples are given to illustrate the scope and spirit of the present invention. The embodiments and examples described herein will make apparent to those skilled in the art, other embodiments and examples. These other embodiments and examples are within the contemplation of the present invention. Therefore, the present invention should be limited only by the appended claims.

What is claimed is:

1. A process for preparing a chocolate-like product containing a non-tempering cocoa butter substitute, said product having a predetermined fat concentration which comprises mixing a nutritive carbohydrate sweetener and said cocoa butter substitute at a weight ratio of about 2:1 to about 10:1 and refining the resulting mixture to form a first refined product;

mixing said first refined product with a second refined product comprising cocoa powder and edible emulsifier in sufficient amounts to form a third refined product containing an emulsifying effective amount of an emulsifier and about 5 to about 25% by weight cocoa powder;

adding additional cocoa butter substitute until the desired fat concentration is achieved;

heating the mixture to temperatures above 90° F. to impart the proper consistency to said third refined product;

cooling, in the absence of tempering, the third refined product under conditions sufficient for crystallization of the product; and then storing the cooled product at a temperature ranging from about 40° F. to about 65° F. for at least about 12 hours, wherein said storage conditions are sufficient to inhibit bloom in said chocolate.

2. The process according to claim 1 in which the cocoa butter substitute is SALATRIM.

3. The process according to claim 2 in which the SALATRIM is SALATRIM 23 CA or SALATRIM 23 SO.

4. The process according to claim 1 in which an anti-blooming agent is additionally present.

5. The process according to claim 4 in which the anti-blooming agent is present in bloom-inhibiting effective amounts.

6. The process according to claim 4 in which the anti-blooming agent is added to the third refined product prior to heating.

7. The process according to claim 1 in which non-fat milk solids, additional cocoa butter substitute, chocolate liquor, additional cocoa powder, lactose, milkfat, whole milk powder, water or a mixture thereof is present in the second refined product.

8. The process according to claim 1 in which the product is stored at temperatures ranging from about 55° to about 65° F.

9. The process according to claim 1 in which the product is stored at temperatures between 40° and 65° F. for 1–10 days.

10. The process according to claim 1 in which the product formed is a SALATRIM based chocolate chip.

11. A process for preparing a chocolate-like product containing a non-tempering cocoa butter substitute, said product having a predetermined fat concentration, said process comprises:

(a) mixing a nutritive carbohydrate sweetener and said cocoa butter substitute at a weight ratio of about 2:1 to about 10:1 and refining the resulting mixture to form a first refined product;

(b) mixing said first refined product with a second refined product comprising cocoa powder and edible emulsifier in sufficient amounts to form a third refined product having an emulsifying effective amount of an emulsifier and about 5% to about 25% by weight cocoa powder;

(c) adding additional cocoa butter substitute until the desired fat concentration is achieved and adding bloom inhibiting effective amounts of an anti-blooming agent to said third refined product;

(d) heating the mixture of (c) to temperatures above 90° F. to impart the proper consistency to said third refined product;

(e) cooling, in the absence of tempering, the product of (d) under conditions sufficient for crystallization of said product; and (f) then storing the cooled product of (e) at a temperature ranging from about 40° F. to about 65° F. for at least about 12 hours, wherein said storage conditions are sufficient to inhibit bloom in said chocolate.

12. The process according to claim 11 in which the cocoa butter substitute is SALATRIM.

13. The process according to claim 12 in which the SALATRIM is SALATRIM 23 CA or SALATRIM 23 SO.

14. The process according to claim 11 in which the product is stored at temperatures ranging from about 55° F. to about 65° F.

15. The process according to claim 11 in which the product is stored at temperature between 40° F. and 65° F. for 1–10 days.

16. The product prepared by any one of the processes of claims 1–15.

17. A process of retarding fat bloom in a chocolate product containing a non-tempering cocoa butter substitute comprising placing in the absence of tempering said chocolate product within about 24 hours after its preparation into storage maintained at a temperature range between about 40° F. and about 65° F. for at least about 12 hours, wherein said storage conditions are sufficient to inhibit bloom in said chocolate product.

18. The process of claim 17 wherein an anti-blooming agent is additionally present in the chocolate product.

19. The process of claim 18 wherein the anti-blooming agent is present in bloom inhibiting effective amounts.

20. Non-tempered chocolate, having reduced tendency to bloom, prepared by the method of claim 17 or claim 19.

21. The process according to claim 17 or claim 19 wherein the cocoa butter substitute is SALATRIM.

22. The process according to claim 21 wherein the SALATRIM is SALATRIM 23 SO or SALATRIM 23 CA.

23. The process according to claim 17 or claim 19 wherein said chocolate product is stored at temperatures between about 55° F. and 65° F., inclusive.

24. A process for preparing a chocolate-like product containing a non-tempering cocoa butter substitute comprising heating a chocolate paste comprising said cocoa butter substitute, cocoa powder, nutritive carbohydrate sweetener, emulsifier and optionally milkfat and optionally a bloom inhibiting effective amount of an anti-blooming agent at temperatures above 90° F., cooling the mass, in the absence of tempering, under conditions sufficient to crystallize the chocolate, and then storing the cooled product at temperatures ranging from about 40° F. to about 65° F. for at least about 12 hours, wherein said storage conditions are sufficient to inhibit bloom in said chocolate.

25. The process according to claim 24, wherein the chocolate paste additionally comprises non-fat milk solids, chocolate liquor, lactose, whole milk powder, water or a mixture thereof.

26. The product prepared by the process of claim 24 or 25.

27. In a process for making a non-tempering chocolate product in which ingredients comprising cocoa powder, nutritive carbohydrate sweetener, emulsifier, non-tempering cocoa butter substitute and optionally milkfat are mixed to form a paste, and the formed paste is subsequently refined and heated and then cooled under conditions effective to crystallize chocolate, the improvement comprising storing said product within about 24 hours after its preparation at a temperature ranging from about 40° F. to about 65° F. for at least about 12 hours, wherein said storage conditions are sufficient to inhibit bloom in said chocolate and wherein said cooling is performed in the absence of tempering.

28. The process according to claim 27 in which the ingredients additionally comprise an anti-blooming agent in bloom inhibiting effective amounts.

29. The process according to claim 27 or 28 wherein the cocoa butter substitute is SALATRIM.

30. The product prepared by the process of claim 27 or 28.

31. The product prepared by the process of claim 29.

\* \* \* \* \*